(12) United States Patent
Pathan et al.

(10) Patent No.: US 7,624,270 B2
(45) Date of Patent: Nov. 24, 2009

(54) INTER SUBNET ROAMING SYSTEM AND METHOD

(75) Inventors: Arnavkumar M. Pathan, Sunnyvale, CA (US); Patrick Pak-Chiu Leung, Saratoga, CA (US); John F. Wakerly, Oakbrook Terrace, IL (US); Nancy Cam Winget, Mountain View, CA (US); Robert Charles Meier, Cuyahoga, OH (US)

(73) Assignee: Cisco Technology, Inc., San Jose, CA (US)

( * ) Notice: Subject to any disclaimer, the term of this patent is extended or adjusted under 35 U.S.C. 154(b) by 753 days.

(21) Appl. No.: 11/060,923

(22) Filed: Feb. 18, 2005

(65) Prior Publication Data
US 2005/0143065 A1 Jun. 30, 2005

Related U.S. Application Data

(63) Continuation-in-part of application No. 10/417,653, filed on Apr. 17, 2003, now Pat. No. 7,350,077.

(60) Provisional application No. 60/439,419, filed on Jan. 10, 2003, provisional application No. 60/429,714, filed on Nov. 26, 2002.

(51) Int. Cl.
*H04L 9/00* (2006.01)
*H04K 1/00* (2006.01)
(52) U.S. Cl. .................... 713/171; 380/247
(58) Field of Classification Search ............ 380/247; 455/435, 422, 432, 436; 709/223; 370/345; 713/171, 176, 185, 182
See application file for complete search history.

(56) References Cited

U.S. PATENT DOCUMENTS

| | | | | |
|---|---|---|---|---|
| 5,237,612 | A * | 8/1993 | Raith | 380/247 |
| 5,325,419 | A * | 6/1994 | Connolly et al. | 455/435.1 |
| 5,657,375 | A * | 8/1997 | Connolly et al. | 455/436 |
| 6,289,214 | B1 * | 9/2001 | Backstrom | 455/422.1 |
| 6,947,408 | B1 * | 9/2005 | Liberti et al. | 370/345 |

(Continued)

OTHER PUBLICATIONS

Brown, D.; Techniques for privacy and authentication in personal communications systems; Publication Date: Aug. 1995; vol. 2, Issue: 4; On pp. 6-10.*

*Primary Examiner*—Andrew L Nalven
*Assistant Examiner*—Monjour Rahim
(74) *Attorney, Agent, or Firm*—Stolowitz Ford Cowger LLP (57) ABSTRACT

The present invention communication network system and method facilitates authentication and registration in a communication network as mobile nodes move from one geographical region to another. Multiple wireless domain services (WDSs) share client authentication information permitting relatively seamless roaming between subnets with minimal interruptions and delays. In one embodiment, a wireless domain service network communication method is performed utilizing partial authentication processes. A mobile node engages in an authentication protocol with a first wireless domain service (WDS) access point in a first subnet. The authentication credentials are forwarded to a second wireless domain service in a second subnet if the authentication protocol is successfully completed. The forwarded authentication credentials are utilized to authenticate the client entering the service area of the second wireless domain service in the second subnet. The authentication credentials can be "pushed" or "pulled" from the first wireless domain service to the second wireless domain service.

20 Claims, 5 Drawing Sheets

U.S. PATENT DOCUMENTS

| | | |
|---|---|---|
| 7,069,444 B2 * | 6/2006 | Lowensohn et al. ......... 713/185 |
| 7,103,769 B1 * | 9/2006 | Fleming et al. ............. 713/151 |
| 2005/0080884 A1 * | 4/2005 | Siorpaes et al. ............ 709/223 |
| 2005/0143065 A1 * | 6/2005 | Pathan et al. ............. 455/432.1 |
| 2005/0289347 A1 * | 12/2005 | Ovadia ....................... 713/171 |
| 2006/0143458 A1 * | 6/2006 | Tie et al. ..................... 713/176 |
| 2007/0130471 A1 * | 6/2007 | Walker Pina et al. ........ 713/182 |
| 2007/0149190 A1 * | 6/2007 | Matsuhashi .............. 455/432.1 |

* cited by examiner

INTER SUBNET ROAMING SYSTEM AND METHOD

RELATED APPLICATIONS

This application is a continuation in part and claims the benefit of patent application, entitled "802.11 Using a Compressed Re-association Exchange to Facilitate Fast Handoff," U.S. patent application Ser. No. 10/417,653, filed Apr. 17, 2003, now U.S. Pat. No. 7,350,077, issued Mar. 25, 2008, which claims priority to U.S. Provisional Patent Application Ser. No. 60/439,419, filed Jan. 10, 2003, and to U.S. Provisional Patent Application Ser. No. 60/429,714, filed Nov. 26, 2002, which is incorporated herein by this reference.

FIELD OF THE INVENTION

This invention relates to the field of network communications. In particular, the present invention relates to fast wireless roaming in an inter subnet environment.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reductions in analyzing and communicating data, ideas and trends in most areas of business, science, education and entertainment. Wireless networks are often utilized to realize many of these advantageous results. Wireless networks typically facilitate distributed processing and communication of information over large geographic areas. However, roaming between geographical areas usually involves user re-authentication and registration which can adversely impact and/or interrupt the perception of continuous information communication.

Wireless networks offer a number of potential advantages including permitting a user to be relatively mobile within coverage areas when engaging in communication activities. Wireless networks usually have a stationary basic infrastructure which communicates information to and from wireless mobile nodes or end user devices such as cell phones, laptops, personal digital assistants (PDAs) and a variety of other devices. A client (e.g., end user) normally accesses a wireless network via a mobile node (MN) by initiating a communication session with an access point (AP), such as a wireless router, switch, etc. The client typically initiates access by engaging in an authentication and registration process with centralized network resources via the access point. Traditionally the authentication and registration process is performed each time a mobile node enters within range or a geographical area associated with an access point.

It is often important in a wireless network for communications to appear continuous with minimal or no interruptions to the continuity of information flow. Maintaining minimal interruptions in conventional communication networks with roaming wireless devices is relatively difficult and/or impossible. When a mobile node or device roams from one geographical region to another geographical region, information communication is limited until the mobile node or device is authenticated and registered in the "new" geographical region. Information not related to authentication and registration is not permitted to be communicated during the "re-authentication and registration" process. Traditional authen-

2 tication and registration mechanisms tend to take a relatively significant amount of time and resources. The "exclusive" utilization of the network communications for authentication and registration results in interruptions to the continuity of other information communications.

Conventional communication network limitations (e.g., bandwidth, etc.) often compound problems associated with traditional authentication and registration processes. For example, traditional authentication and registration processes usually rely on direct communication of authentication information between a single central authentication resource and a mobile node. Bottlenecks and delays in authentication often occur when large numbers of mobile nodes attempt to authenticate with the single central authentication resource at the same time causing interruptions and delays in communication of other information as the mobile nodes move from one geographical area to another.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention is a system and method that facilitates authentication and registration in a communication network as mobile nodes move from one geographical region to another. The present invention enables relatively seamless roaming between subnets in a wireless environment (e.g., an IEEE 802.11 compliant environment). Interruptions and delays in information communication due to roaming authentication and registration activities are minimized. The present invention permits multiple wireless domain services (WDSs) to share information about clients permitting deployment scaling to cover larger geographical areas. In addition, present invention embodiments facilitate more roams/second over more geographical areas associated with multiple wireless domain services which enables users to travel between geographical areas in relatively fast moving vehicles (e.g., in high speed trains, airplanes, etc.).

In one embodiment of the present invention, a wireless domain service network communication method is performed. A mobile node engages in an authentication protocol with a first wireless domain service (WDS) access point in a first subnet. The authentication credentials are forwarded to a second wireless domain service in a second subnet if the authentication protocol is successfully completed. The forwarded authentication credentials are utilized to authenticate the client when it enters the service area of the second wireless domain service in the second subnet. The present invention includes a variety of embodiments with various architectures and protocols. For example, the authentication credentials can be "pushed" from the first wireless domain service to the second wireless domain service. In another exemplary implementation of the present invention, the authentication credentials are "pulled" from the first wireless domain service to the second wireless domain service.

Embodiments of the present invention's network communication systems and methods facilitate efficient authentication of mobile nodes and communication of information. The present invention's communication protocols enable wireless domain services to communicate with each other and share information about wireless mobile nodes or clients. The wireless domain services can cooperatively operate to create a "virtual wireless domain service" across layer 3 domain environments in which clients using wireless mobile nodes can be authenticated across subnets in the "virtual wireless domain service". Allowing peer and/or neighboring wireless domain services associated with different subnets to communicate authentication information with one another permits the client to authenticate with a faster protocol in different wireless domain services as the mobile node moves from one subnet to another subnet.

Figure 1:
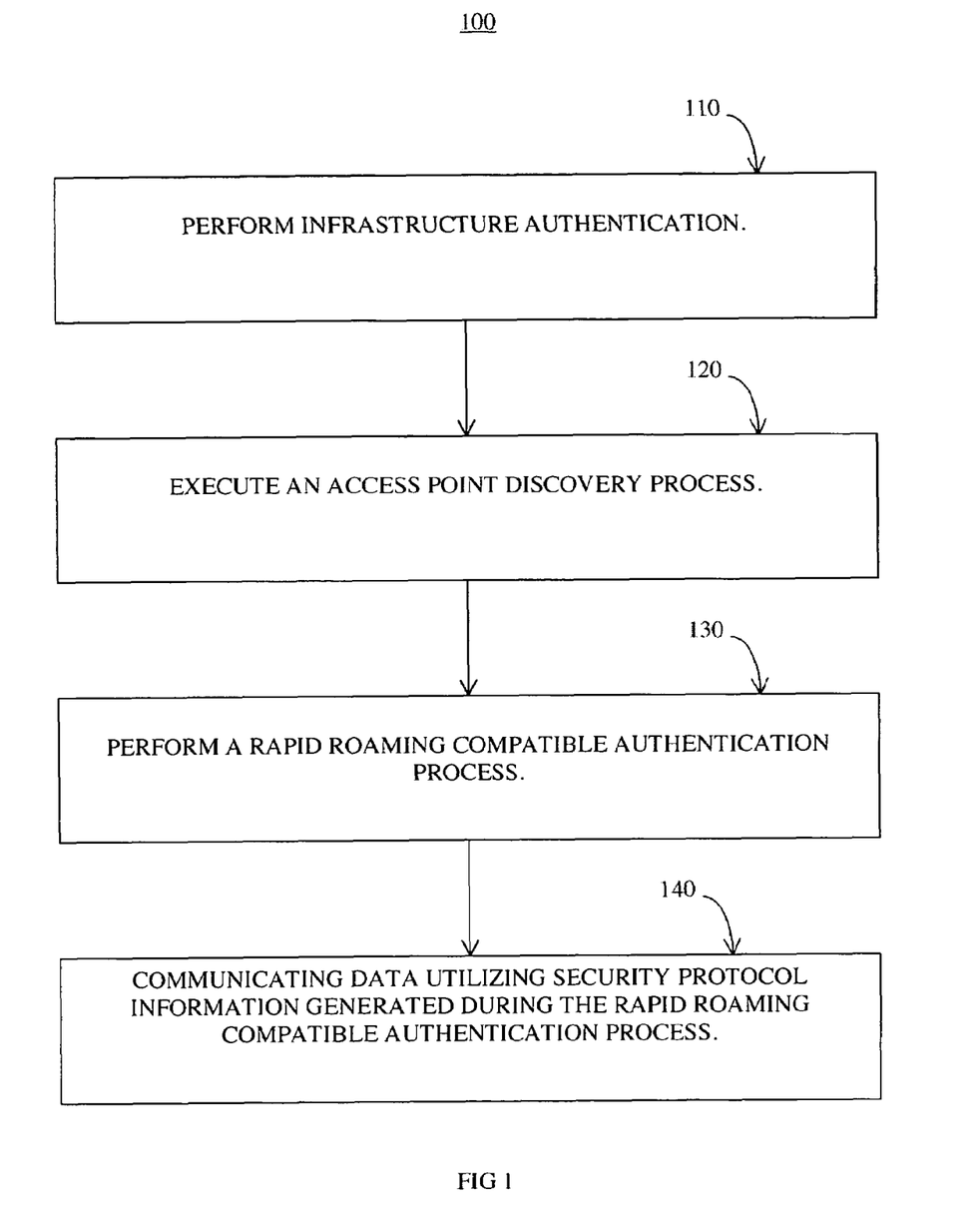
FIG. 1 is a flow chart of an exemplary network communication method in accordance with one embodiment of the present invention.

FIG. 1 is a flow chart of network communication method 100 in accordance with one embodiment of the present invention. Network communication method 100 permits wireless domain services to leverage authentication communications of neighboring and/or peer wireless domain services (e.g., listed in configuration files). In one embodiment, neighboring wireless domain services authenticate clients by utilizing a partial authentication process as the clients move from one geographical region to another and do not engage in a full authentication process unless the client is attempting an "initial" access of the communication network. In one exemplary implementation, each wireless domain service is associated with a subnet and participates in an authentication protocol with client mobile nodes via access points.

In step 110, infrastructure authentication is performed. In one embodiment of the present invention, various infrastructure components (e.g., access points, wireless domain services, etc.) authenticate with a main authentication server. In one exemplary implementation, each access point establishes a shared key (e.g., a shared context key) with a wireless domain service. The shared key can be used to pass important information (e.g., other keys) between the wireless domain service and an access point (e.g., during a fast secure roam between WDSs).

In step 120, an access point discovery process is executed. In one embodiment, an access point provides information on its security capabilities in beacons and probe responses. For example, a Robust Security Network Information Element (RSNIE) can be used to advertise security capabilities. In one exemplary implementation, central key management capability is communicated by a MAC organizationally unique identifier (OUI) value and a type value in an Authenticated Key Management (AKM) suite selector of the RSNIE. The access point discovery process can include a request from a mobile node to authenticate the client utilizing the mobile node.

In step 130, a rapid roaming compatible authentication process is performed. In one embodiment of a rapid roaming compatible authentication process, a wireless domain service utilizes a partial authentication process to authenticate clients. For example, a wireless domain service can use an expedited key management process to authenticate clients. If a client is attempting an initial network access, a rapid roaming compatible authentication process performs a full authentication process.

In step 140, data is communicated utilizing security protocol information generated during the rapid roaming compatible authentication process. For example, keys generated during the rapid roaming compatible authentication process are utilized to encrypt data communicated between an access point and a mobile node.

Figure 2:
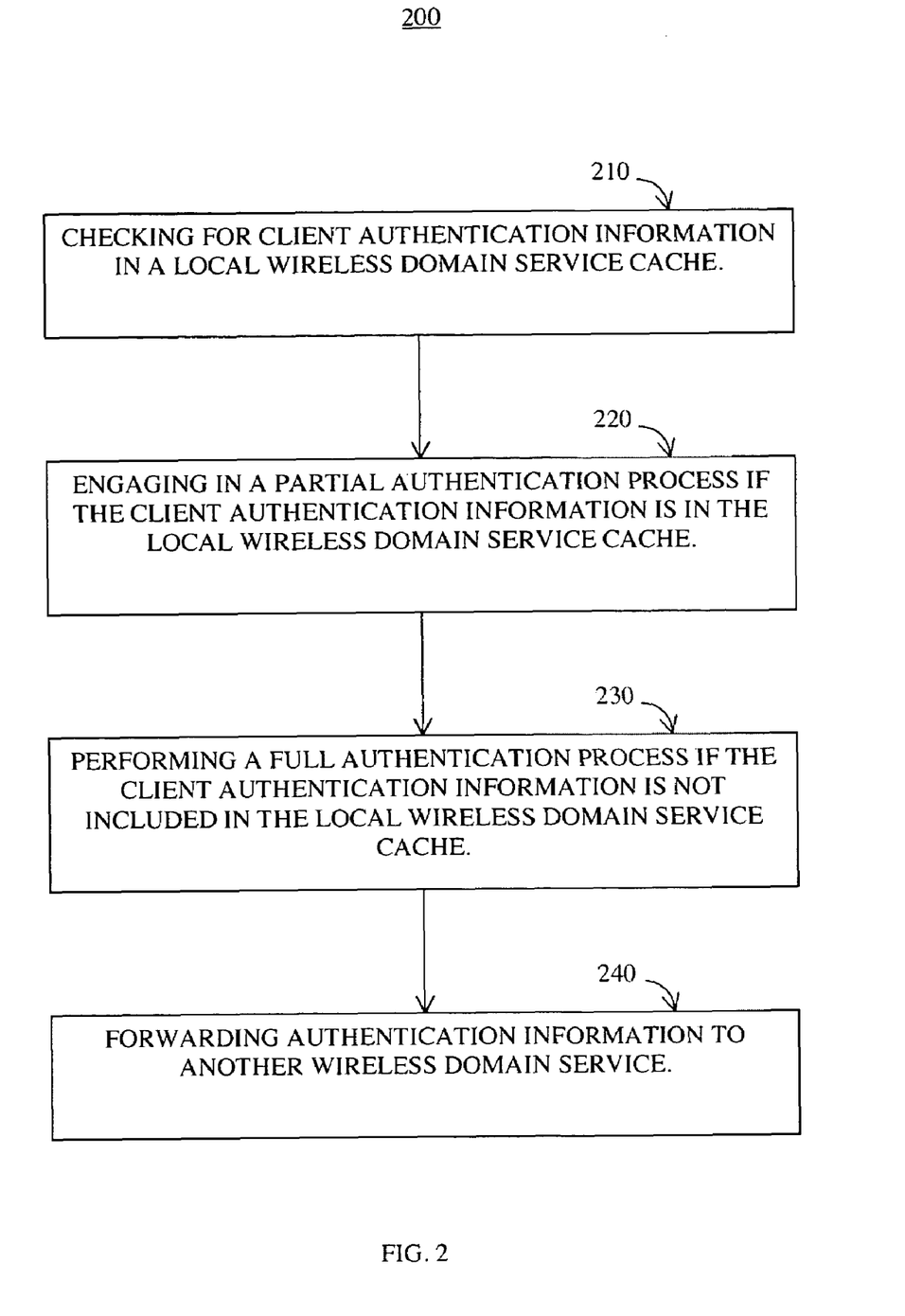
FIG. 2 is a flow chart of an authentication protocol in accordance with one embodiment of the present invention.

FIG. 2 is a flow chart of authentication protocol 200 in accordance with one embodiment of the present invention. Authentication protocol 200 is one exemplary implementation of an authentication protocol performed in step 130 of network communication method 100. In one exemplary implementation, authentication protocol 200 is utilized when a client engages in an "initial" communication with the network.

In step 210, a local wireless domain service memory (e.g., cache, RAM, flash, etc.) is checked for client authentication information. In one embodiment, local memories of the wireless domain service are checked for client authentication information. For example, it is determined whether the client identification and valid base transient key associated with the client are stored in the local memory.

In step 220, a limited or partial authentication process is engaged in if the client authentication information is in the local wireless domain service memory. In one embodiment of the present invention a partial authentication process involves utilization of a base transient key stored in a local memory of a wireless domain service. The base transient key is a key value that is utilized to generate pair-wise transient keys.

In step 230, a full authentication process is performed if the client authentication information is not included in the local wireless domain service memory. The wireless domain service confirms the validity of the mobile node authentication information with a main authentication and authorization server (e.g., a centralized server). For example, the client identification, Medium Access Control (MAC) address, network session key, and other authentication and authorization information is confirmed. If validated, the wireless domain service stores the authentication information in a local memory and authorizes the mobile node to communicate with the communications network. The wireless domain service can also forward the authentication and authorization information on a "push" or "pull" basis to other neighboring and/or peer wireless domain services.

In step 240, authentication information is forwarded to another wireless domain service. For example, the authentication information (e.g., authentication credentials, keys, etc.) is forwarded from a first wireless domain service in a first subnet to a second wireless domain service (e.g., a neighboring wireless domain service) in a second subnet if the authentication protocol is successfully completed with the first wireless domain service. In one exemplary implementation, information associated with authentication keys (e.g., a base transient key, network session key, key request key) is forwarded to the second wireless domain service.

It is appreciated that the authentication information can be forwarded to the second wireless domain service in a variety of ways. In one embodiment, authentication information is "pushed" from the first wireless domain service to the second wireless domain service and is available to the second WDS before the client enters an area associated with the second WDS. For example, once the first wireless domain service successfully authenticates and registers a client (e.g., a mobile node) the first wireless domain service automatically forwards the authentication information to wireless domain services associated with neighboring geographical areas and/or other subnets. For example, when a WDS authenticates a client the WDS has the Base Transient Key (BTK) for the client and the client's medium access control (MAC) address. In one embodiment the WDS generates a context request messages in accordance with a context control specification. The message can be encrypted with a context transfer key (CTK) that is derived together with neighboring wireless domain services. The receiving wireless domain service extracts the BTK from the message and stores it in a local memory. In one exemplary implementation, when a client refreshes authentication information in a current wireless domain service the information is also refreshed in neighboring wireless domain services. Client authentication information can be pushed to all the wireless domain services in a network or a subset of WDSs (e.g., to the neighboring WDSs, listed in the configuration file of the wireless domain service).

The authentication information can also be "pulled" from the first wireless domain service by the second wireless domain service. For example, the second wireless domain service sends a request to the first wireless domain service for the authentication information (e.g., at predefined intervals, or when a mobile node enters the second wireless domain service area, or during times of low activity, etc.). In one exemplary implementation, the authentication information is pulled as a client enters an area associated with the "pulling" WDS. Thus, information is forwarded to the specific WDS associated with the area the client is roaming to and a WDS does not have to update its neighboring WDSs with "refresh" information.

In one embodiment of the present invention, a location register or list is utilized to facilitate coordination of information "pushed" and/or "pulled" between wireless domain services. In one exemplary implementation, a wireless LAN location register (WLR) facilitates management of authentication information communicated between wireless domain services. The WLR maintains a registry which includes an entry for each infrastructure node and mobile node in a network. The WLR maintains information on the topological and logical relationships of a plurality of wireless domain services associated with a network and formulates predictions regarding future roaming of a client. For example, the WLR can automatically retrieve the information from a topology configuration database and wireless domain services themselves. A WLR can be implemented with a "virtual IP address" and "virtual MAC address" that are utilized in configuring the WDSs in a network and have backup WLRs with the same "virtual IP address" and "virtual MAC address".

When a client enters or roams to a "new" WDS, the new wireless domain service can query the WLR regarding predictions on future client roams and "push" the authentication information to other wireless domain services associated with the predictions. In one exemplary implementation in which authentication information is "pulled", the WLR is queried by the "new" WDS for information about the identity of the WDS a client was previously authenticated by and the new WDS then pulls the authentication information from the previous WDS. The new wireless domain services notify the WLR when a mobile node completes registration and authentication with an access point associated with the new wireless domain service which the WLR uses to update the registry information. The WLR can be included in and/or operate as a root infrastructure node.

In one embodiment, a WLR also participates in establishment of lateral secure sessions between wireless domain services. For example, a first WDS forwards a context request message to the WLR and the WLR process the context request message. For example, the WLR authenticates the context request message using security credentials for the session with the first WDS. If the context message is not successfully authenticated the WLR replies with an error context reply message. If the context request message is successfully authenticated, the WLR generates a context transient key for each secure context request. The first WDS processes the context reply message. For example, the first WDS authenticates the Context reply message, the context transient key is decrypted and other transient keys (e.g., WTKs) are extracted. The first WDS sends a context request message to a second WDS including the other transient keys (e.g., WTKs). The second WDS processes the context request message and decrypts the keys. If the second WDS successfully processes the request, the second WDS then sends a context reply message to the first WDS. The first WDS processes the context reply message. If first WDS successfully processes the request a context message session is established between the wireless domain services and the client authentication information is communicated between the wireless domain services.

It is also appreciated that a variety of communication protocols can be utilized to communicate with wireless domain services. In one embodiment of the present invention, a wireless domain service is included in a structured wireless-aware network (SWAN) and a Wireless LAN Context Control Protocol (WLCCP) is utilized to communicate with wireless domain services. A (WLCCP) can be used to securely manage "operational context" for mobile nodes. The operational context can include a) cached configuration parameters, b) dynamically established parameters (e.g., security credentials) and c) the data forwarding paths to and from a mobile node. For example, a WLCCP protocol can be utilized for communications between a wireless domain service and an access point and/or other wireless domain services. The WLCCP compliant information is encapsulated in a TCP/IP compliant communication frame during communication. The WLCCP can support both IP and non-IP protocols. For example, a mobile node does not need to be configured with a permanent IP address. In one exemplary implementation, an IEEE 802 address is used as a permanent mobile node identifier.

In one embodiment, when a wireless client or mobile node roams and begins to "associate" with a root device (e.g., access point) in a different subnet (e.g., the second subnet), the "new" root device forwards the wireless client's information to the second wireless domain service. The second wireless domain service device checks a local memory to determine if the second wireless domain service device already has authentication information associated with the roaming client. If the second wireless domain service has authentication information already in the local memory, the second wireless domain service engages in a "partial" authentication with the client or mobile node. If the "partial" authentication is successful, the second wireless domain service provides a client authentication credential to the "new" root device and forwards the client authentication credentials to its neighboring WDSs. The mobile node can then communicate with root device.

It is appreciated that the implementations of the present invention can include a plurality of wireless domain services servicing multiple mobile service nodes. For example, the authentication information from the second wireless domain service can be forwarded to a third wireless domain service in a third subnet. As the wireless client's authentication information is passed from one wireless domain service to another, the new wireless domain services can participate in a partial or reduced authentication process with the client. This saves a lot of time and allows the wireless clients to roam rapidly across subnets (e.g., within less than 150 ms).

It is appreciated that the implementations of the present invention can include wireless domain services servicing multiple subnets. For example, a first wireless domain service can cover a first and second subnets; a second wireless domain service can cover a third, fourth and fifth subnets; a third wireless domain service can cover a sixth subnet; etc.

Figure 3:
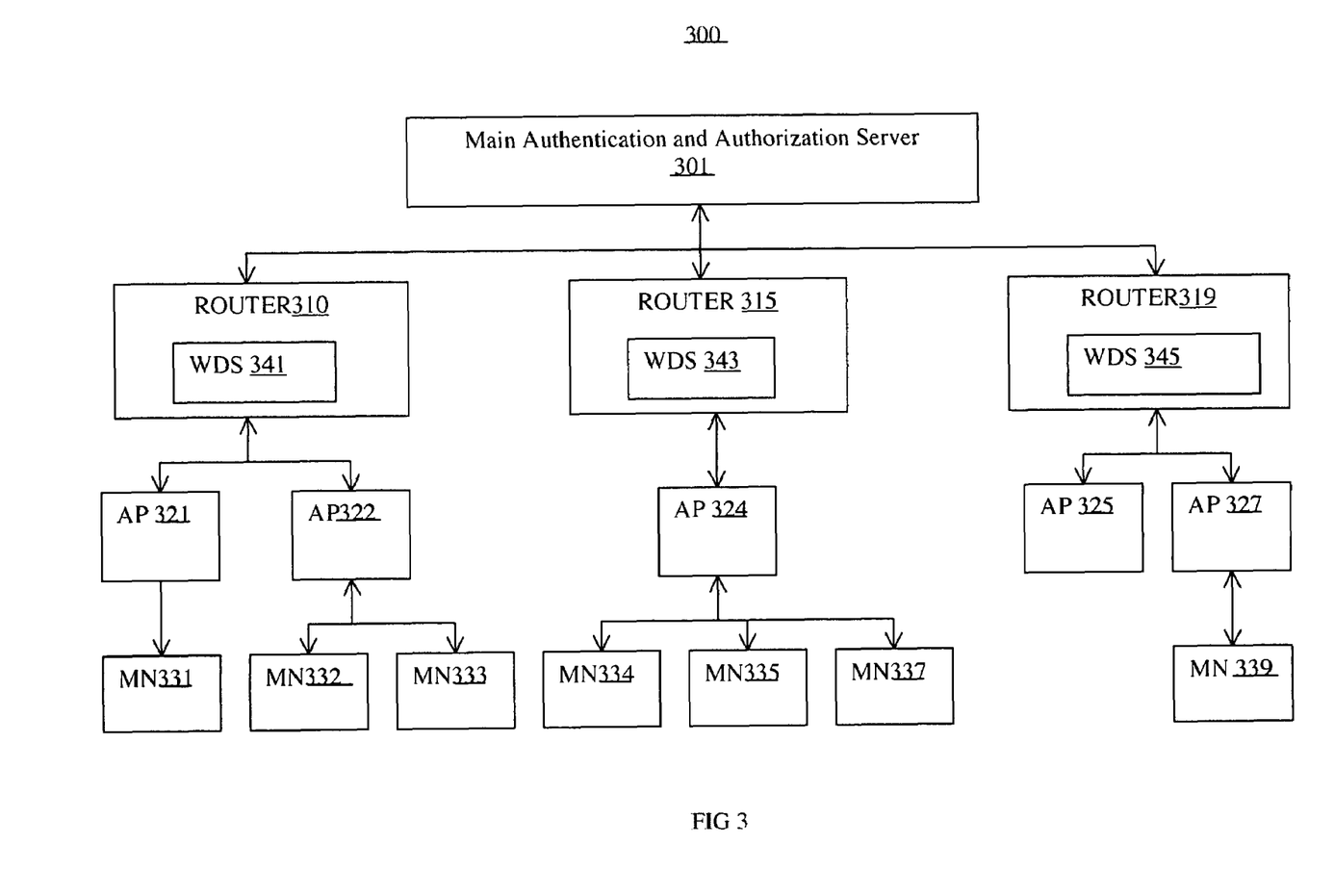
FIG. 3 is a block diagram of a communications network in accordance with one embodiment of the present invention.

FIG. 3 is a block diagram of communications network 300 in accordance with one embodiment of the present invention. Communications network 300 includes main authentication and authorization server 301, routers 310, 315 and 319, access points 321, 322, 324, 325 and 327, mobile nodes 331, 332, 333, 334, 335, 337 and 339. Routers 310, 315 and 319 include wireless domain service components 341, 343 and 345 respectively. Main authentication and authorization server 301 is communicatively coupled to wireless domain service components 341, 343 and 345. Wireless domain service 341 is communicatively coupled to access points 321 and 322. Wireless domain service 343 is communicatively coupled to access point 324. Wireless domain service component 345 is communicatively coupled to access points 325 and 327. Access point 321 can be communicatively coupled to mobile node 331 and access point 322 is communicatively coupled to mobile nodes 332 and 333. Access point 324 can be communicatively coupled to mobile nodes 334 through 337. Access point 327 can be communicatively coupled to mobile node 339.

The components of communications network 300 cooperatively operate to provide information communication. Main authentication and authorization server 301 stores client authentication and authorization information (e.g., client identification information, client username, password, encryption related information, etc.). Routers 310 through 319 route communications within the network and provide a platform for implementing wireless domain services 341 through 345. Access points 321 through 327 transmit and receive information to and from clients on mobile nodes. Mobile nodes 331 through 339 enable clients (e.g., end users) to interact with communications network 300 and communicate information to other components included in communications network 300. When a client utilizes a mobile node (e.g., mobile nodes 331 through 339) to initiate an access to communications network 300, the client engages in an authentication process with a wireless domain service (e.g., WDSs 341 through 345) via an access point (e.g., access points 321 through 327).

It is appreciated that a present invention wireless domain service can be implemented in a variety of ways. For example, a wireless domain service can be implemented in software, firmware, hardware and/or combinations thereof. In one exemplary implementation, a wireless domain service is implemented as computer readable code stored on a computer readable medium, wherein the software code includes instructions for directing a processor to perform rapid roaming authentication process. In one exemplary implementation the processor is a processor included in a router. The processor can be included in a wireless access module (WAM). In another exemplary implementation, a wireless domain service is implemented in a memory and processor included in an access point.

The wireless domain service checks if the client's authentication information (e.g., a base transient key associated with the client) is stored in a local memory. If the authentication information is stored in a local memory, the wireless domain service authenticates the client. If the authentication information is not stored in a local memory, the wireless domain service begins an authentication process for the client with the main authentication and authorization server 301. If the client provides the correct identification and valid information to the main authentication and authorization server 301 via the wireless domain server, the main authentication and authorization server 301 returns corresponding authentication information (e.g., a network session key) to the wireless domain service. In one embodiment, the main authentication and authorization server 301 can forward or "push" the corresponding authentication information to a plurality of wireless domain services and a client does not have to engage in a full authentication with those wireless domain services. The wireless domain service derives further authentication information (e.g. base transient key, key request key, etc.) and forwards to access point and the client. The wireless domain service stores the authentication information in a local memory and authorizes the client to engage in communications on the communication network. The wireless domain service also forwards the authentication information to a neighboring wireless domain service.

In one exemplary implementation, a client utilizing mobile node 331 initiates communications with communication network 300 via access point 321. Access point 321 forwards the client's request information to wireless domain service 341 which checks if authentication information associated with the client is stored in a local memory. If valid client authentication information (e.g., a valid base transient key associated with the client) is stored in a local memory of wireless domain service 341, the mobile node 331 is authenticated and authorized to communicate on network 300. Mobile node 331 is also tracked as registered with wireless domain service 341. If valid client authentication information (e.g., a valid base transient key associated with the client) is not stored in a local memory of wireless domain service 341 the client request for access to communication network 300 from mobile node 331 is forwarded to main authentication and authorization server 301 for participation in a full authentication process. If the client provides the correct information (e.g., an authorized identification, etc.) and successfully participates in an authentication and authorization process with the main authentication and authorization server 301, the client is permitted access to communication network 300 and wireless domain service 341 stores authentication information associated with the client in a local memory.

The client authentication information stored in a local memory of wireless domain service 341 is also forwarded to wireless domain service 343. Wireless domain service 343 stores the authentication information in a local memory of wireless domain service 343. If the client on mobile node 331 moves into a geographical area associated with wireless domain service 343, the client forwards basic authentication information (e.g., identification), which wireless domain service 343 recognizes as stored in the local memory. Wireless domain service 343 and mobile node 331 participate in a partial authentication process (e.g., based upon the base transient key). If the client successfully completes the partial authentication process with wireless domain service 343 the client is permitted to communicate with other components of communication network 300, without participating in a full authentication and authorization process with main authentication and authorization server 301. In one embodiment, wireless domain service 343 also forwards or "pushes" the authentication information to wireless domain service 345 when the client authenticates with the wireless domain service 343.

Present invention wireless domain services can enhance continuous mobile network communications across both layer 2 (e.g., intra-subnet roaming) and layer 3 (e.g., inter-subnet roaming) while also simplifying deployment and management of network resources. In one embodiment, a wireless domain service expands intra-subnet roaming features (e.g., including subnet context manager features) to inter-subnet communications. For example, a present wireless domain service can perform rapid roaming re-association and authentication features described in co-pending patent application entitled "802.11 Using a Compressed Reassociation Exchange to Facilitate Fast Handoff" (U.S. patent application Ser. No. 10/417,653), filed Apr. 17, 2003 and expand the rapid roaming re-association and authentication features for application across inter-subnets (e.g., layer 3 communications).

Present invention wireless domain services can be configured to be compatible with IP protocols. In one embodiment, access points are grouped in access point subnets that correspond to a respective IP subnet (e.g., layer 2 subnet) and a single WDS is associated with each access point subnet. For example, a wireless domain service handles authentication while mobile nodes move and associate with access points associated with a common IP subnet corresponding to a layer 2 switch. The wireless domain service also handles authentication while mobile nodes move and associate with access points associated with different IP subnets corresponding to different layer 3 routers.

The features of a present invention wireless domain services can be utilized to support a variety of network activities. For example, a present invention wireless domain services can be utilized to support network activities like wireless voice over internet protocol (VoIP) communications and enterprise resource planning (ERP). A wireless domain service can also perform radio management aggregation while facilitating support of network infrastructure auditing activities. In one exemplary implementation, a wireless domain service is configured with a redundant backup WDS.

Figure 4:
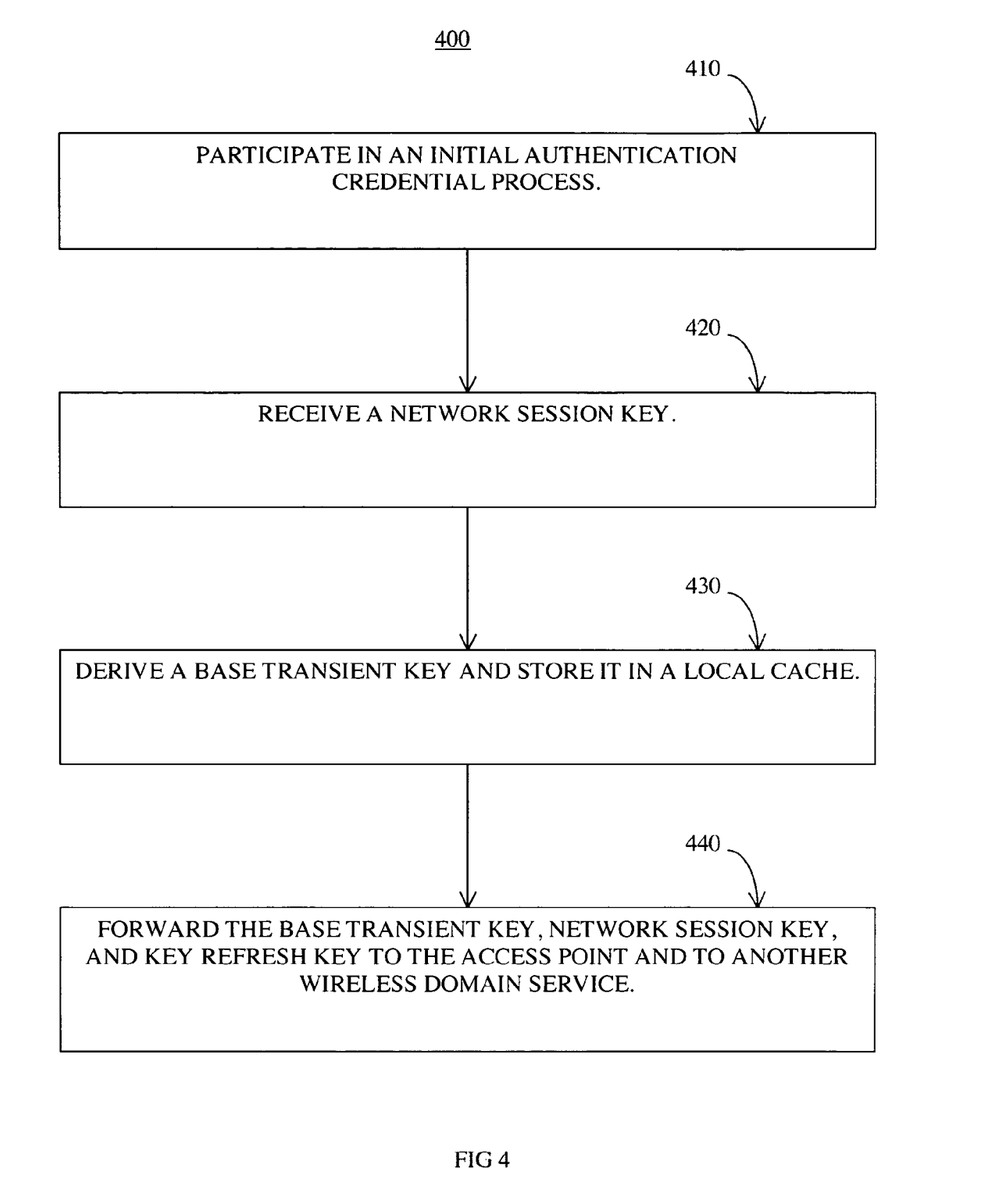
FIG. 4 is a block diagram of a full authentication process in accordance with one embodiment of the present invention.

FIG. 4 is a flow chart of full authentication process 400 in accordance with one embodiment of the present invention. Full authentication process 400 is utilized if a client is attempting to an initial session access to a communication network.

In step 410, an initial authentication credential process is performed. In one embodiment of the present invention, an extensible authentication protocol (EAP) credential is received.

In step 420, a network session key is received. In one embodiment, a wireless domain service receives the network session key from a main authentication, authorization and accounting server. The network session key is utilized to derive other communication encryption keys. In one exemplary implementation, a network session key is established by a successful authentication between a wireless mobile node and a main authentication server.

In step 430, a base transient key is derived if a network session key is received. The base transient key is stored in a local memory. In one embodiment of the present invention, a base transient key and a key request key (KRK) are derived by combining the network session key with random numbers (e.g., nonces) obtained via a four way handshake. The four way handshake appears to the client to be between the client and an access point the client is authenticating to, but the access point puts a WLCCP header on the frames from the four way handshake and forwards them to the WDS.

In step 440, the base transient key is forwarded to an access point and another wireless domain service. For example, the base transient key is forwarded to the access point a client is associated with and to neighboring wireless domain services. The neighboring wireless domain services store the base transient key in a local memory. In one embodiment, a rekey number (RN) (which can be set to one for an initial authentication) is also forwarded to access point and neighboring wireless domain services. In one embodiment, network session key, key refresh key, re-key number etc are also forwarded to the neighboring wireless domain services to provide complete client context. The client and access point use the base transient key, rekey number, and a basic service set identifier (BSSID) to derive a pair wise transient key (PTK) which includes a shared session key for unicast traffic. The pair wise transient key is utilized to encrypt communications between the client on a mobile node and the access point. The pair wise transient key can also be utilized to forward a group transient key (GTK) to the client. The group transient key can be used to send multicast and broadcast data between the client on a mobile node and the access point.

Figure 5:
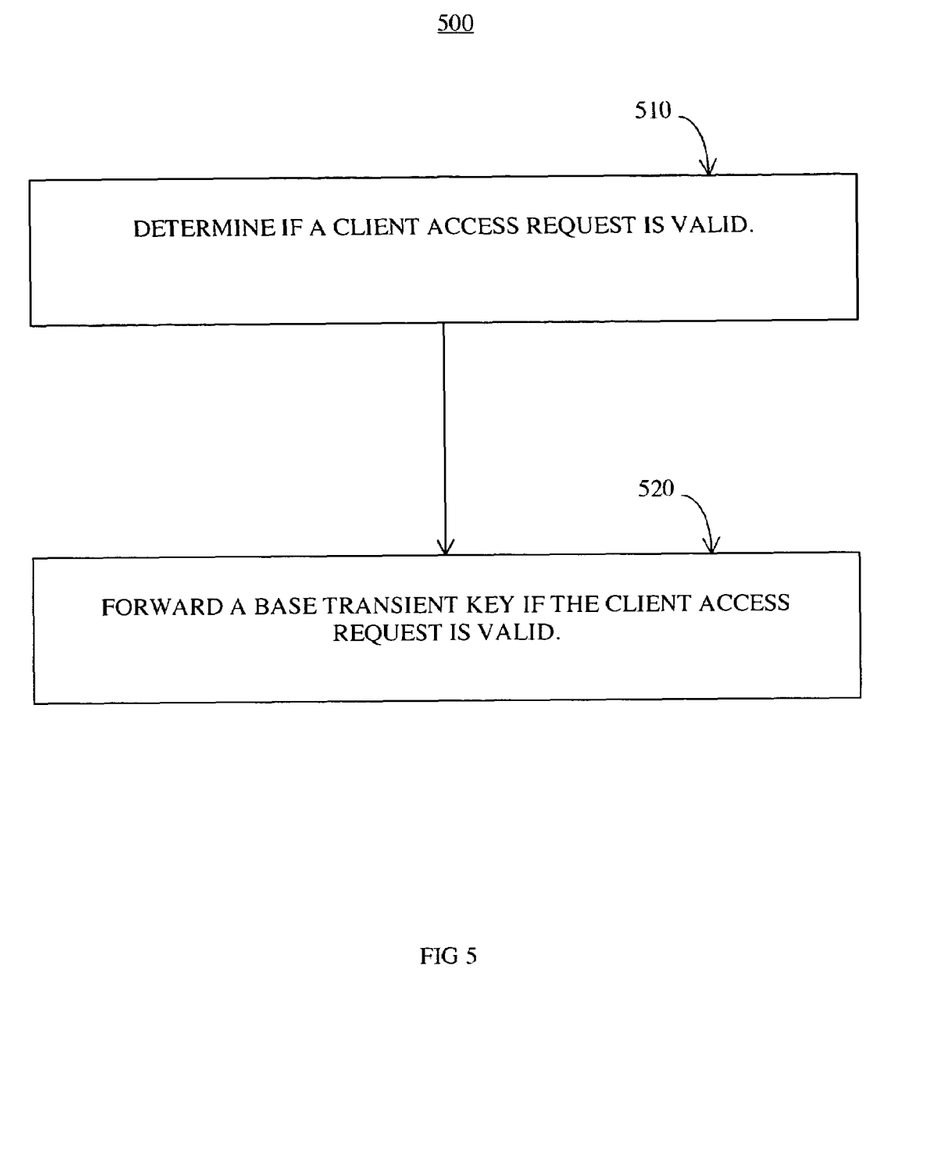
FIG. 5 is a flow chart of a partial authentication process in accordance with one embodiment of the present invention.

FIG. 5 is a flow chart of partial authentication process 500 in accordance with one embodiment of the present invention. Partial authentication process 500 can be utilized if a client has setup an initial session access to a communication network and is attempting to setup a session access to a communication network again after it moved to different geographic area.

In step 510, determine if a client access request is valid. A client access request can be a re-association request for a different access point as a client roams between access point coverage areas. In one embodiment of the present invention, a message integrity check (MIC) is performed. For example, a key request key (KRK) can be utilized to perform the message integrity check. A sequentially incrementing RN can also be utilized in the verification of the client.

In step 520, a base transient key is forwarded if the access request is valid. In one embodiment of the present invention, a wireless domain service forwards a base transient key associated with the client to the access point if the client's access request is valid. The access point utilizes the base transient key to derive a pair-wise transient key. The base transient key is retrieved from local memory associated with the wireless domain service. In one embodiment of the present invention, the base transient key is retrieved after it is determined it is stored in the local memory. For example, when a wireless domain service checks the local memory for base transient key associated with a client (e.g., in step 210 of process 200). The base transient key, network session key, key request key, re-key number can also be forwarded to neighboring wireless domain services which store them in a local memory associated with the respective wireless domain services.

In one embodiment of the present invention, a client calculates its next PTK after forwarding a re-association request to "new" access point. The client calculates the next PTK by performing a cryptographic hash of the BTK, the RN, and the BSSID. The "new" access point forwards the re-association request to the WDS after encapsulating the request in a WLCCP compliant frame. The WDS verifies the MIC (e.g., step 510). If a valid request, the WDS encrypts the BTK and the RN, associated with the client, with the CTK shared by the WDS and the "new" access point and forwards the encrypted message to the "new" access point. The "new" access point hashes the BTK, RN and BSSID to calculate the same new PTK as the client. Again, the new PTK can be used to encrypt and forward a GTK to the client.

In one embodiment of the present invention, during partial authentication method, a roaming client forwards a single re-association request frame to the access point and the access point sends a single frame to the WDS. The access point receives a single frame reply from WDS with authentication information (e.g., a base transient key) if the client is authenticated to communicate on the network.

Thus, the present invention is a system and method that facilitates fast wireless roaming across layer 3 subnets of a communication network. The present invention's partial authentication method and system enables rapid re-authentication of the client upon it entering a "new" wireless domain service area while permitting conservation of network resources that would otherwise be occupied with full authentication activities. The present invention also allows easier scaling of wireless network deployment (e.g., from campuswide coverage to metro coverage). In addition, coordinating client authentication directly between multiple wireless domain services permits more roams/second and enables more continuity of communications in rapidly moving mobile devices (e.g., mobile devices on a high speed train, fast car, etc.).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   receiving, with a first wireless domain service device, authentication information of a mobile device from a second wireless domain service device, wherein the first wireless domain service device is configured to provide network access to mobile devices located in a first geographical area, wherein the second wireless domain service device is configured to provide network access to mobile devices located in a second geographical area, and wherein the authentication information is configured to indicate that the second wireless domain service device previously authenticated the mobile device for communication over a network;
   receiving a request for the mobile device to communicate over a network through the first wireless domain service device; and
   authenticating the mobile device according to the authentication information received from the second wireless domain service device utilizing a reduced authentication process responsive to the request, wherein the mobile device, once authenticated by the first wireless domain service device, is capable of communicating over the network through the first wireless domain service device.

2. The method of claim 1 further comprising forwarding the authentication information to a third wireless domain service device having geographical area that neighbors the first wireless domain service device.

3. The method of claim 2 wherein the authentication information is pushed to the third wireless domain service device from the first wireless domain service device.

4. The method of claim 1 further comprising:
   detecting the mobile device enters into the first geographical area; and
   sending a query regarding whether another wireless domain service device includes the authentication information of the mobile device.

5. The method of claim 1 wherein receiving the authentication information of the mobile device from the second wireless domain service device further comprises pulling the authentication information from the first wireless domain service device responsive to the detecting of the mobile device entering the first geographical area.

6. The method of claim 1 wherein each of the wireless domain service devices operate to provide network access over Internet Protocol compliant subnets.

7. The method of claim 1 wherein each of the wireless domain service devices cover unique geographical areas.

8. A network communication system comprising:
   a communication component for transmitting and receiving information to and from a mobile device; and
   a wireless domain service device for implementing a wireless domain service including inter subnet fast roaming authentication and registration of the mobile device, wherein the wireless domain service device is configured to receive authentication information of the mobile device from a neighboring wireless domain service device, wherein the authentication information is configured to indicate that the neighboring wireless domain service device previously authenticated the mobile device for communication over the network, wherein the wireless domain service device is configured to authenticate the mobile device according to the authentication information received from the neighboring wireless domain service device utilizing a reduced authentication process, and wherein the mobile device, once authenticated by the wireless domain service device, is capable of communicating over the network via the wireless domain service device.

9. The network communication system claim 8 wherein the wireless domain service device participates in peer authentication by distributing and receiving authentication information to and from one or more neighboring wireless domain service devices associated with other subnets.

10. The network communication system claim 9 wherein authentication information is pushed to the wireless domain service device from the neighboring wireless domain service devices.

11. The network communication system claim 9 wherein the authentication information is pulled by the wireless domain service device from the neighboring wireless domain service devices.

12. The network communication system of claim 8 wherein the wireless domain service device provides authentication credentials of the mobile device to a root device when the inter subnet fast roaming authentication is successful.

13. The network communication system of claim 8 wherein the inter subnet fast roaming authentication included a peer authentication portion and a direct client partial authentication portion.

14. The network communication system of claim 13 wherein information associated with the peer authentication portion is received from peer wireless domain devices.

15. A computer readable medium for storing computer readable code including instruction for directing a processor in the performance of a communication network roaming authentication process comprising:
   directing operations associated with communication of client authentication information of a mobile device to and from one or more wireless domain service devices, wherein the wireless domain service devices are configured to provide network access to mobile devices located in different geographical areas, and wherein the client authentication information is configured to indicate that at least one of the wireless domain service devices previously authenticated the mobile device for communication over a network;
   receiving a request for the mobile device to communicate over a network through the first wireless domain service device; and
   authenticating the mobile device according to the client authentication information received from at least one of the wireless domain service devices utilizing a reduced authentication process responsive to the request, wherein the mobile device, once authenticated, is capable of communicating over the network through the first wireless domain service device.

16. The computer-readable medium for storing computer readable code including instruction for directing the processor in the performance of the communication network roaming authentication process of claim 15 further comprising forwarding the client authentication information to another wireless domain service device having a neighboring geographical area.

17. The computer-readable medium for storing computer readable code including instruction for directing the processor in the performance of the communication network roaming authentication process of claim 15 further comprising receiving the client authentication information from at least one of the wireless domain service devices.

18. The computer-readable medium for storing computer readable code including instruction for directing the processor in the performance of the communication network roaming authentication process of claim 15 wherein access points and mobile nodes authenticate with at least one of the wireless domain service devices.

19. The computer-readable medium for storing computer readable code including instruction for directing the processor in the performance of the communication network roaming authentication process of claim 15 wherein the client authentication information is communicated in a Wireless LAN Context Control Protocol (WLCCP).

20. A system comprising:
   means for receiving, with a first wireless domain service device, authentication information of a mobile device from a second wireless domain service device, wherein the first wireless domain service device is configured to provide network access to mobile devices located in a first geographical area, wherein the second wireless domain service device is configured to provide network access to mobile devices located in a second geographical area, and wherein the authentication information is configured to indicate that the second wireless domain service device previously authenticated the mobile device for communication over a network;
   means for receiving a request for the mobile device to communicate over a network through the first wireless domain service device; and
   means for authenticating the mobile device according to the authentication information received from the second wireless domain service device utilizing a reduced authentication process responsive to the request, wherein the mobile device, once authenticated by the first wireless domain service device, is capable of communicating over the network through the first wireless domain service device.

* * * * *

UNITED STATES PATENT AND TRADEMARK OFFICE
CERTIFICATE OF CORRECTION

PATENT NO.      : 7,624,270 B2  
APPLICATION NO. : 11/060923  
DATED           : November 24, 2009  
INVENTOR(S)     : Pathan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

PATENT NO.        : 7,624,270 B2  
APPLICATION NO.   : 11/060923  
DATED             : November 24, 2009  
INVENTOR(S)       : Pathan et al.

Page 1 of 1

It is certified that error appears in the above-identified patent and that said Letters Patent is hereby corrected as shown below:

Column 13, line 8     In Claim 9, before "claim" insert -- of --.

Column 13, line 13    In Claim 10, before "claim" insert -- of --.

Column 13, line 17    In Claim 11, before "claim" insert -- of --.

Signed and Sealed this  
Thirty-first Day of May, 2011

David J. Kappos  
*Director of the United States Patent and Trademark Office*